(12) United States Patent
Nemoto et al.

(10) Patent No.: US 10,895,449 B2
(45) Date of Patent: Jan. 19, 2021

(54) SHAPE MEASURING DEVICE

(71) Applicant: Mitutoyo Corporation, Kawasaki (JP)

(72) Inventors: Kentaro Nemoto, Kawasaki (JP);
Masaoki Yamagata, Kawasaki (JP);
Ryohei Kanno, Kawasaki (JP); Hiroaki Kawata, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 16/601,802

(22) Filed: Oct. 15, 2019

(65) Prior Publication Data
US 2020/0132439 A1 Apr. 30, 2020

(30) Foreign Application Priority Data
Oct. 29, 2018 (JP) .................................. 2018-203095

(51) Int. Cl.
*G01B 11/24* (2006.01)
*G01B 11/00* (2006.01)

(52) U.S. Cl.
CPC ............ *G01B 11/24* (2013.01); *G01B 11/002* (2013.01)

(58) Field of Classification Search
CPC ..... G01B 11/24; G01B 11/25; G01B 11/2513; G01B 11/2518; G01B 15/00; G01B 15/04; G01B 2210/52; G01B 2210/54; G01B 2210/58; G01B 11/0625; G01B 11/0675; G01B 11/26; G01B 21/20; G01N 15/1463; G01N 2015/1006; G01N 2021/8829; G01N 21/9515; G01N 2203/0617; G01N 2203/0635; G01N 2203/0641; G01N 2223/305; G01N 2223/3308; G01N 2223/646; G01N 2291/02475; G01N 2291/02827; G01N 23/044; G01N 27/902; G01N 29/0654; G01N 29/4418; G01N 33/4833; G01N 3/066; G01N 3/068; G01N 3/08; G01N 3/20; G01N 2291/106;
(Continued)

(56) References Cited

U.S. PATENT DOCUMENTS 5,457,325 A * 10/1995 Huberty ................. A43D 1/025
250/559.29
5,548,405 A * 8/1996 Motosugi ............. G01B 11/005
250/559.21

(Continued)

FOREIGN PATENT DOCUMENTS

JP 2003-022834 A 1/2003

*Primary Examiner* — Michael P Stafira
(74) *Attorney, Agent, or Firm* — Oblon, McClelland, Maier & Neustadt, L.L.P.

(57) ABSTRACT

A shape measuring device includes a holding unit which holds a measuring target of which a shape is to be measured, a first measurement unit which measures relative coordinates of a plurality of measurement points on a first surface of the measurement target with respect to a defined point, a second measurement unit which operates independently from the first measurement unit and measures relative coordinates of a plurality of measurement points on a second surface of the measurement target, which is a reverse surface of the first surface, with respect to the defined point, and a calculation unit which calculates a shape of the measurement target on the basis of results measured by the first measurement unit and the second measurement unit.

5 Claims, 6 Drawing Sheets

(58) Field of Classification Search
CPC ..... G01N 2291/056; G01N 2291/2634; G01N 29/043; G01N 21/55; G01N 21/94; G01N 25/72; G01N 2291/0289; G01N 2291/0421; G01N 2291/0422; G01N 2291/044; G01N 29/225; G01N 29/24; G01N 29/2487; G01N 29/262; G01N 29/265; G01N 21/6458; G02B 26/105; G02B 26/0858; G02B 27/0093; G02B 27/48; G02B 6/12; G02B 6/122; G02B 6/125; G02B 6/32; G02B 1/11; G02B 1/118; G02B 21/08; G02B 21/082; G02B 21/16; G02B 27/283; G02B 27/30; G02B 21/008; G02B 5/26; G02B 1/105; G02B 1/14; G02B 1/16; G02B 21/0028; G02B 21/0044; G02B 21/006; G02B 21/26; G02B 21/365; G02B 5/0221; G02B 5/0231; G02B 5/0242; G02B 5/0278; G02B 5/0294; G02B 5/045; G02B 5/208; G02B 5/282; G02B 5/285; G02B 5/30; G02B 5/3016; G02B 5/3033; G02B 5/3066; G01J 3/00; G01J 3/0205; G01J 3/0208; G01J 3/0218; G01J 3/0248; G01J 3/0264; G01J 3/108; G01J 3/42
See application file for complete search history.

(56) References Cited

U.S. PATENT DOCUMENTS

| | | | | |
|---|---|---|---|---|
| 5,850,290 | A * | 12/1998 | Horiguchi | A61B 5/1077 356/602 |
| 7,880,899 | B2 * | 2/2011 | Horita | G01B 11/2522 356/608 |
| 2009/0040533 | A1 * | 2/2009 | Takahashi | G01B 11/2522 356/612 |
| 2009/0268199 | A1 * | 10/2009 | Inoguchi | G01B 11/2522 356/124 |
| 2011/0278753 | A1 * | 11/2011 | Breuer | B29C 48/06 264/40.1 |
| 2012/0019836 | A1 * | 1/2012 | Honma | G01B 11/2527 356/603 |
| 2016/0153772 | A1 * | 6/2016 | Jeong | G06K 9/036 356/610 |

* cited by examiner

SHAPE MEASURING DEVICE

BACKGROUND OF THE INVENTION

Field of the Invention

The present invention relates to a shape measuring device that measures a shape of a measurement target.

Description of the Related Art

Conventionally, a shape measuring device for measuring a shape of a measurement target is known. Japanese Patent Laid-Open No. 2003-22834 discloses a shape measuring method for measuring a shape of a separator for a fuel cell, and aims to inhibit a thinned separator from being deformed by an external force at the time of measurement as much as possible.

Also, the method disclosed in Japanese Patent Laid-Open No. 2003-22834 discloses such a method in which two non-contact displacement sensors are disposed to face each other with the separator interposed therebetween, distances to front and back surfaces of the separator are measured by the sensors disposed on the respective surface sides, and a thickness of the separator is obtained by subtracting the distances obtained by these two sensors from a distance between the sensors.

In addition, in order to measure a thickness of a measurement target, it is conceivable to use a measuring tool such as a caliper or a micrometer.

However, in the case of the method disclosed in Japanese Patent Laid-Open No. 2003-22834, there is a problem that an exact thickness cannot be obtained when the sensors do not face each other accurately, and it is required to synchronize the opposed sensors to measure the thickness.

In addition, in the case of a configuration in which measurement is performed using a laser on the basis of the method described in Japanese Patent Laid-Open No. 2003-22834, there is a problem that, when a measurement target includes a through hole, one sensor receives a laser from the other sensor opposite thereto, and thus measurement is not possible.

Further, in the case of using measuring tools such as a caliper and a micrometer, there is a problem that, although measurement can be performed accurately when a surface shape of a measurement target is simple, it is difficult to perform a minute measurement for a measurement target having a complex surface shape such as a separator.

SUMMARY OF THE INVENTION

One embodiment of the present invention provides a shape measuring device which can measure a shape of a measurement target having a complex surface shape with high accuracy.

One embodiment of the present invention is a shape measuring device including a holding unit which holds a measuring target of which a shape is to be measured, a first measurement unit which measures relative coordinates of a plurality of measurement points on a first surface of the measurement target with respect to a defined point, a second measurement unit which operates independently from the first measurement unit and measures relative coordinates of a plurality of measurement points on a second surface of the measurement target, which is a reverse surface of the first surface, with respect to the defined point, and a calculation unit which calculates a shape of the measurement target on the basis of results measured by the first measurement unit and the second measurement unit.

Further features of the present invention will become apparent from the following description of exemplary embodiments with reference to the attached drawings.

DESCRIPTION OF THE EMBODIMENTS

Hereinafter, a shape measuring device according to the present invention will be described in detail with reference to the drawings. Also, in the following drawings, in order to make each configuration easy to understand, the shapes, scales, numbers, and the like of the structures may differ from those of actual structures.

First Embodiment (Configuration of Shape Measuring Device 1)

Figure 1:
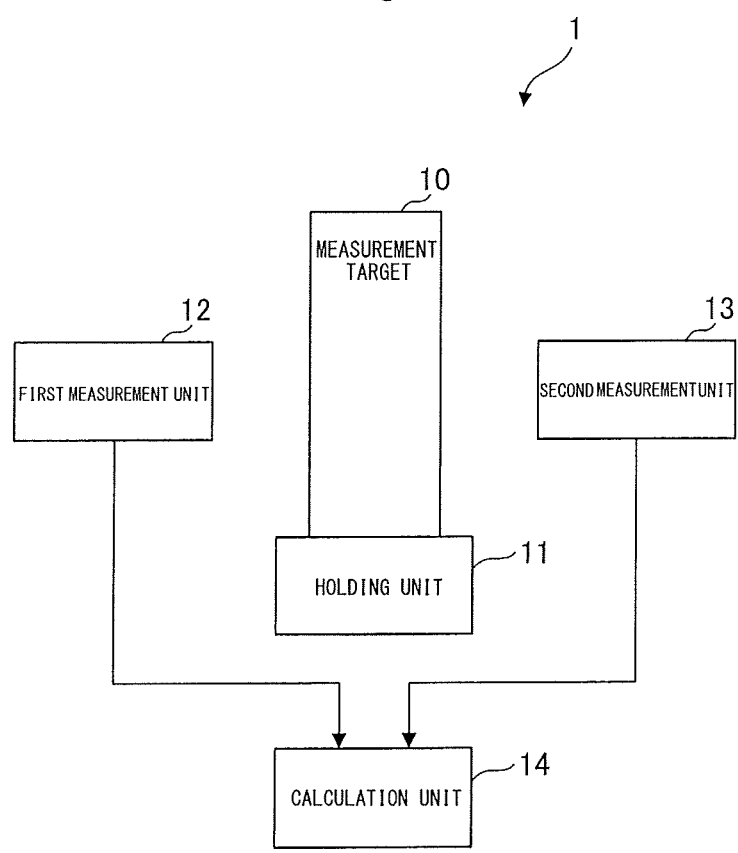
FIG. 1 is a block diagram showing a shape measuring device according to a first embodiment of the present invention.

FIG. 1 is a block diagram showing a shape measuring device according to a first embodiment of the present invention. The shape measuring device 1 of the present embodiment includes a holding unit 11 which holds a measuring target 10 of which a shape is to be measured, a first measurement unit 12 which measures relative coordinates of a plurality of measurement points on a first surface of the measurement target 10 with respect to a defined point, a second measurement unit 13 which operates independently from the first measurement unit 12 and measures relative coordinates of a plurality of measurement points on a second surface of the measurement target 10, which is a reverse surface of the first surface, with respect to the defined point, and a calculation unit 14 which calculates a shape of the measurement target 10 on the basis of results measured by the first measurement unit 12 and the second measurement unit 13.

Although the measurement target 10 is a separator in the present embodiment, any object other than the separator may be used as the measurement target 10 in the present invention. The separator is a component that is used in a battery and plays a role of preventing a short circuit (a failure) by blocking contact between a positive electrode and a negative electrode.

The separator is used in, for example, a lithium ion secondary battery that is widely used for batteries of an electric vehicle (EV), a hybrid vehicle (HV), a mobile phone, a tablet (a computer), and a smartphone, and plays a role of transmitting lithium ions between the positive electrode and the negative electrode. In addition, the separator is used in, for example, a fuel cell employed in a fuel cell vehicle (FCV) or an energy farm, and plays a role of blocking fuel gas and air. The surface shapes of such separators become more complex year by year, and reduction in thickness is progressing in order to further achieve reduction in weight.

In a manufacturing process of a separator, it is required to confirm that a surface shape of the manufactured separator is as specified. According to the shape measuring device 1 of the present embodiment, the surface shape of the separator can be measured with high accuracy.

The holding unit 11 holds the measurement target 10. For example, the holding unit 11 is fixed to a floor surface, and fixes and holds the measurement target 10. When the holding unit 11 holds a thin separator as the measurement target 10, in order to prevent the separator from being bent due to its own weight, it is desirable to dispose and hold the separator such that a surface expanding direction of the separator is parallel to a vertical direction.

The first measurement unit 12 and the second measurement unit 13 are desirably disposed in a direction orthogonal to the surface expanding direction of the separator that is the measurement target 10. The measurement target 10 held by the holding unit 11 is disposed between the first measurement unit 12 and the second measurement unit 13.

The first measurement unit 12 and the second measurement unit 13 measure the relative coordinates of the plurality of measurement points on the surface of the measurement target 10 with respect to the specified point, for example, on the basis of reflection of an irradiated laser light from the measurement target 10. Any known measurement device may be applied as the first measurement unit 12 and the second measurement unit 13, and ones using a laser may be used and ones using something other than a laser may be used. The first measurement unit 12 and the second measurement unit 13 may scan the surface of the measurement target 10 with a scanning line, or may scan the surface of the measurement target 10 with a scanning area. The first measurement unit 12 and the second measurement unit 13 are each configured of a probe and a computer, for example.

The calculation unit 14 calculates the shape of the measurement target 10 using, for example, the relative coordinates measured by the first measurement unit 12 and the relative coordinates measured by the second measurement unit 13. The calculation unit 14 is configured of a computer, for example.

Example 1

(Configuration of Shape Measuring Device 100)

Figure 2:
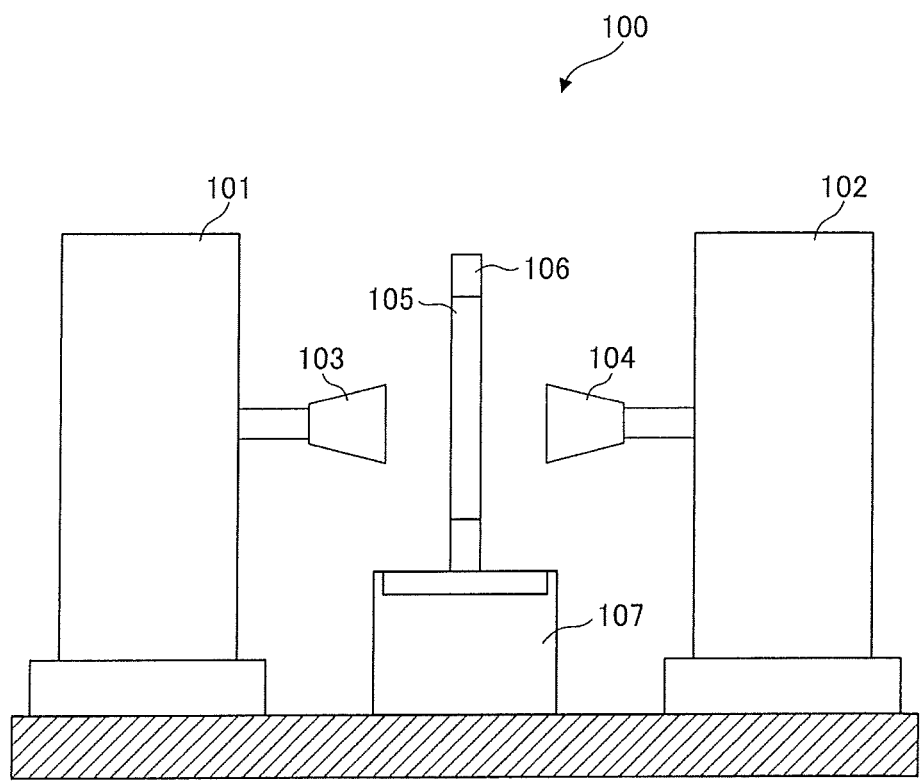
FIG. 2 is a schematic front view showing a configuration of a shape measuring device 100 according to a first example of the present invention.

FIG. 2 is a schematic front view showing a configuration of the shape measuring device 100 according to a first example of the present invention. The shape measuring device 100 is configured to have a separator 105 which is a measurement target, a holding jig 106 which holds the separator 105, a probe 103 which measures the separator 105 in a non-contact manner, a control device 101 which controls the probe 103, a probe 104 which measures the separator 105 in a non-contact manner, a control device 102 which controls the probe 104, and a moving device 107 which moves the holding jig 106 on a manufacturing line of the separator 105.

The separator 105 is a separator for a fuel cell and is disposed such that the first surface out of measurement target surfaces of the separator 105 faces the probe 103, and the second surface out of the measurement target surfaces of the separator 105 faces the probe 104. The second surface is a reverse surface of the first surface. Since the separator 105 has a small distance between the first surface and the second surface and is easily deformed, the holding jig 106 holds the first surface and the second surface of the separator 105 as a frame to prevent the deformation. In addition, directions in which the first surface and the second surface of the separator 105 expand are parallel to the vertical direction. Thus, bending of the separator 105 due to its own weight can be prevented.

The holding jig 106 is fixed to the moving device 107. The moving device 107 can move on the manufacturing line of the separator 105. By moving the moving device 107 to position the separator 105 between the probe 103 and the probe 104, a shape of the separator 105 can be measured as part of the manufacturing line of the separator 105.

The probe 103 is a sensor that acquires data (for example, relative coordinates) of the shape of the measurement target in a non-contact manner using, for example, a laser, and is a two-dimensional sensor or a three-dimensional sensor. The control device 101 performs control of the probe 103, that is, drive control of the probe 103 and management of data acquired by the probe 103. The probe 104 is a sensor that acquires non-contact data (for example, relative coordinates) of the shape of the measurement target in a non-contact manner using, for example, a laser, and is a two-dimensional sensor or a three-dimensional sensor. The control device 102 performs control of the probe 104, that is, drive control of the probe 104 and management of data acquired by the probe 104.

In the present example, the probe 103 and the probe 104 are provided, the shape of the first surface of the separator 105 is measured by the probe 103, and the shape of the second surface of the separator 105 is measured by the probe 104. The data of the shape of the first surface of the separator 105 measured by the probe 103 and the data of the shape of the second surface of the separator 105 measured by the probe 104 are transmitted to a computer (the calculation unit) (not shown), and the computer can synthesize the data of the shape of the first surface and the data of the shape of the second surface to calculate a thickness of the separator 105. Any known method may be used for the calculating method. In addition, either the control device 101 or the control device 102 may also function as the computer (calculation unit).

(Processing of Shape Measuring Device 100)

Figure 3:
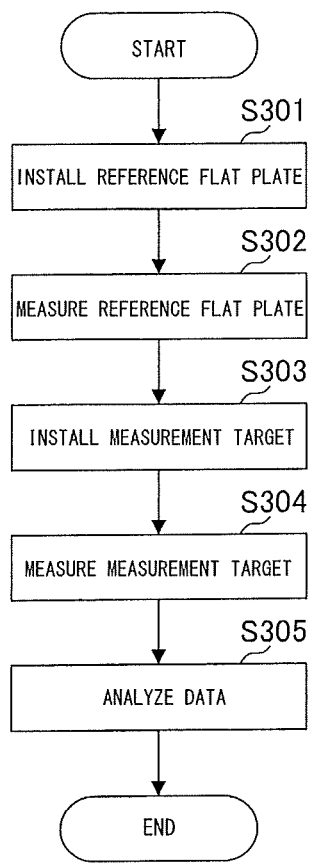
FIG. 3 is a flowchart showing measurement processing performed by the shape measuring device 100 shown in FIG. 2.

FIG. 3 is a flowchart showing measurement processing performed by the shape measuring device 100 shown in FIG. 2. When the probe 103 or the probe 104 included in the shape measuring device 100 is used, it is impossible to measure an absolute value of the thickness. For this reason, in order to measure the thickness, a reference device such as a reference plane is required. In step S301 of FIG. 3, a reference flat plate is installed in the shape measuring device 100 as the reference device. For the reference flat plate, a ceramic flat plate having a known thickness and shape can be used. The reference flat plate is installed by disposing the reference flat plate in place of the separator 105 in FIG. 2.

In step S302, the shape measuring device 100 uses the probe 103 and the probe 104 to measure the reference flat plate as the reference device. This reference device serves as a reference device for qualification. The measurement of the reference flat plate in step S302 may be performed only once when the probe 103 and the probe 104 are installed. Sensor attachment positions, that is, reference positions of the probe 103 and the probe 104, can be specified by measuring the reference flat plate in step S302. Further, reference data for thickness comparison can be acquired by measuring the reference flat plate in step S302.

In step S303, the separator 105 is installed in the shape measuring device 100 as the measurement target. The separator 105 is installed by disposing the separator 105 in place of the reference flat plate installed in step S301.

In step S304, the shape measuring device 100 measures the separator 105 using the probe 103 and the probe 104. At this time, the shape measuring device 100 can shorten a measurement time by performing the measurement using the probe 103 and the measurement using the probe 104 in parallel. Also, in order to prevent a state in which the probe 103 and the probe 104 measure the same place of the separator 105 and the laser radiated by one probe is incident on the other probe, making the measurement impossible, the shape measuring device 100 controls the probe 103 and the probe 104 asynchronously.

In step S305, the shape measuring device 100 analyzes the data measured by the probe 103 and the probe 104. In the analysis, the shape measuring device 100 first synthesizes the data measured by the probe 103 and the data measured by the probe 104, and uses the synthesized data to calculate the thickness of the separator 105 (comparison measurement with respect to the reference device) and the surface shape of the separator 105 (geometric tolerance with respect to the reference device, etc.).

Figure 4:
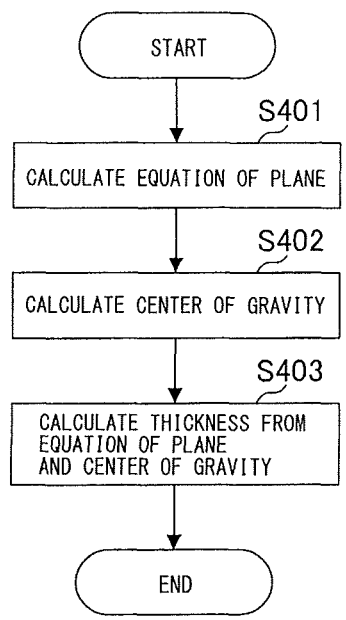
FIG. 4 is a flowchart showing an example of processing for obtaining a thickness of a separator 105.
Figure 5:
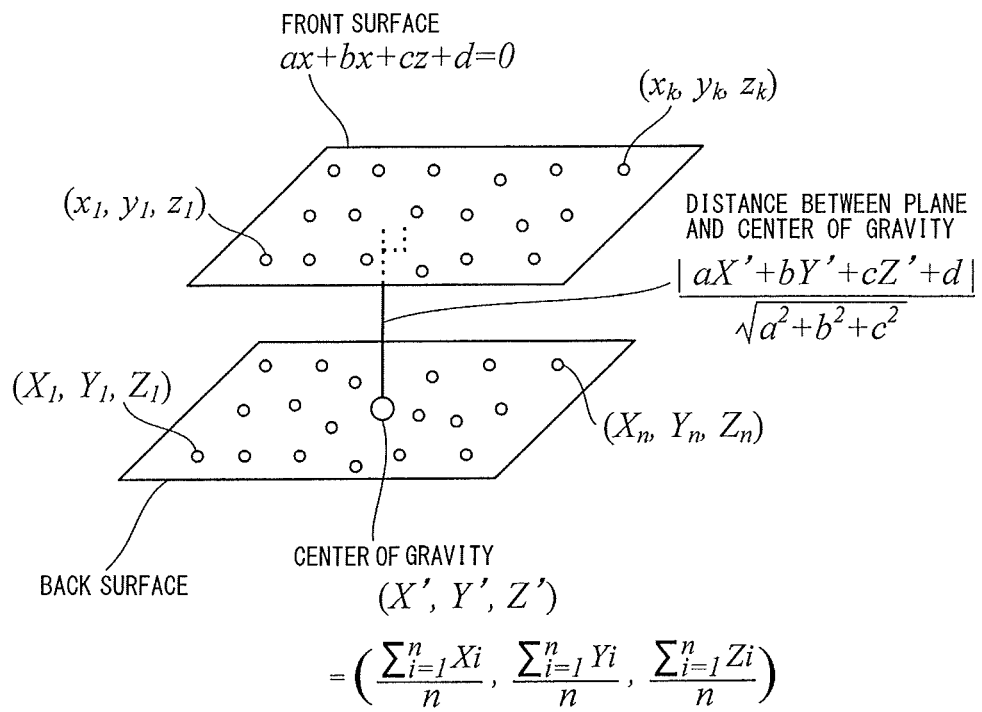
FIG. 5 is a diagram for explaining the processing of FIG. 4.

FIG. 4 is a flowchart illustrating an example of processing for obtaining the thickness of the separator 105. FIG. 5 is a diagram for explaining the processing of FIG. 4.

First, in step S401, the shape measuring device 100 uses the data measured by the probe 103 to obtain an equation of a plane from a group of points on the front surface (first surface) using a least squares method, a minimum zone method, or the like (see FIG. 5).

Next, in step S402, the shape measuring device 100 obtains a center of gravity from a group of points on the back surface (second surface) using the data measured by the probe 104 (see FIG. 5).

Next, in step S403, the shape measuring device 100 obtains a thickness of the plane from the equation of the plane obtained in step S401 and the center of gravity obtained in step S402 (see FIG. 5).

Also, when there are a plurality of points from which thicknesses are calculated, the shape measuring device 100 can create a thickness map. In addition, the shape measuring device 100 can display the thicknesses in an easy-to-see manner by changing colors in accordance with the thicknesses.

Example 2

(Configuration of Shape Measuring Device 200)

Figure 6:
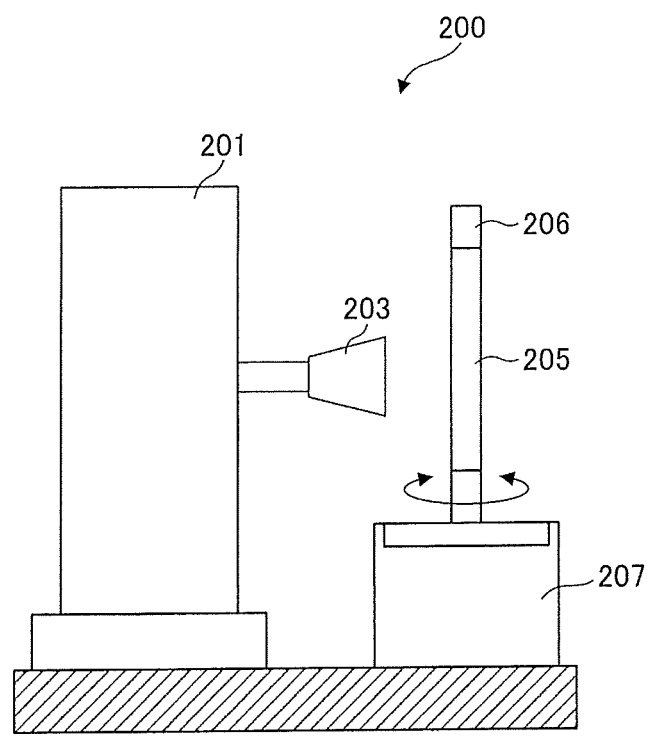
FIG. 6 is a schematic front view showing a configuration of a shape measuring device 200 according to a second example of the present invention.

FIG. 6 is a schematic front view showing a configuration of a shape measuring device 200 according to a second example of the present invention. The shape measuring device 200 is configured to have a separator 205 which is a measurement target, a holding jig 206 which holds the separator 205, a probe 203 which measures the separator 205 in a non-contact manner, a control device 201 which controls the probe 203, and a rotary stage 207 which fixes the holding jig 206 to be rotatable about the vertical direction. The separator 205, the holding jig 206, the probe 203 and the control device 201 are the same as the separator 105, the holding jig 106, the probe 103 and the control device 101 shown in FIG. 2. In the present example, the holding jig 206 is rotated by the rotary stage 207 to adjust orientation of the separator 205 so that the probe 203 and the control device 201 also serve as substitutes for the probe 104 and the control device 102 shown in FIG. 2.

The present example is configured to include one probe 203. The rotary stage 207 rotates the holding jig 206 that holds the separator 205 and stops the rotation at positions where measurement surfaces of the separator 205 face the probe 203.

First, the rotary stage 207 rotates the holding jig 206 and stops the rotation at a position where the first surface of the separator 205 faces the probe 203. In this state, the shape measuring device 200 measures the first surface of the separator 205 with the probe 203. Thereafter, the rotary stage 207 rotates the holding jig 206 180 degrees and stops the rotation at a position where the second surface of the separator 205 faces the probe 203. In this state, the shape measuring device 200 measures the second surface of the separator 205 with the probe 203. The processing described with reference to FIGS. 3 and 4 also applies to the present example.

According to the present example, since only one probe is required, costs can be reduced and an installation area of the device can be reduced, as compared with the first example.

Other Embodiments

Also, it should be understood that the present invention is not limited to the examples described above, and various modifications are included. For example, the aforementioned examples have been described in detail for easy understanding of the present invention, and the present invention is not necessarily limited to those having all the described configurations. In addition, a part of a configuration of one example can be replaced with a configuration of another example, and a configuration of another example can be added to a configuration of one example. Further, additions, omissions and substitutions of other configurations can be made for a part of a configuration of each example.

Summary of Embodiments

One embodiment of the present invention is a shape measuring device including a holding unit which holds a measuring target of which a shape is to be measured, a first measurement unit which measures relative coordinates of a plurality of measurement points on a first surface of the measurement target with respect to a defined point, a second measurement unit which operates independently from the first measurement unit and measures relative coordinates of a plurality of measurement points on a second surface of the measurement target, which is a reverse surface of the first surface, with respect to the defined point, and a calculation unit which calculates a shape of the measurement target on the basis of results measured by the first measurement unit and the second measurement unit.

According to the present embodiment, it is possible to provide a shape measuring device which can measure a shape of a measurement target having a complex surface shape with high accuracy.

According to the present embodiment, it is unnecessary to make the first measurement unit and the second measurement unit face each other with the measurement target interposed therebetween, and measurements can be performed independently and can be performed with high accuracy.

Also, according to the present embodiment, since the first measurement unit and the second measurement unit measure independently, synchronizing control is not required.

In addition, according to the present embodiment, even if there is a through hole in the measurement target, one sensor can avoid an influence of the other sensor opposite thereto and can measure without any problem.

Further, according to the present embodiment, by measuring the coordinates of the plurality of measurement points, minute measurements can be performed even if the surface shape of the measurement target is a complex shape.

Also, one embodiment of the present invention is characterized in that the first measurement unit and the second measurement unit include a non-contact sensor which measures the plurality of measurement points without contacting the measurement target.

According to the present embodiment, by measuring in a non-contact manner, deformation of the measurement target due to the contact can be avoided, and more accurate measurements can be performed.

Also, one embodiment of the present invention is characterized in that the first measurement unit and the second measurement unit have a two-dimensional sensor which scans the surfaces of the measurement target.

According to the present embodiment, the two-dimensional sensor can measure the plurality of measurement points on the measurement target surfaces at a high speed and with high accuracy.

Also, one embodiment of the present invention is characterized in that the first measurement unit is a measurement unit which performs measurement using a first sensor facing the first surface of the measurement target, the second measurement unit is a measurement unit which performs measurement using a second sensor facing the second surface of the measurement target, and the holding unit fixes and holds the measurement target during a measurement period.

According to the present embodiment, since the measurement target is fixed and held during the measurement period, more accurate measurements can be performed.

Also, one embodiment of the present invention is characterized in that the first measurement unit and the second measurement unit are measurement units which perform measurement using the same sensor, and the holding unit can switch a surface of the measurement target facing the sensor between the first surface and the second surface.

According to the present embodiment, since only one sensor is required, costs can be reduced.

What is claimed is:

1. A shape measuring device comprising:
    a holder configured to hold a measuring target having a measurable shape;
    a first measurement circuit configured to measure relative coordinates of a plurality of measurement points on a first surface of the measurement target with respect to a defined point;
    a second measurement circuit configured to operate independently from the first measurement circuit and measure relative coordinates of a plurality of measurement points on a second surface of the measurement target, which is a reverse surface of the first surface, with respect to the defined point; and
    calculation circuitry configured to:
        calculate a shape of the measurement target on the basis of results measured by the first measurement circuit and the second measurement circuit,
        use the data measured by the first measurement circuit to obtain an equation of a plane from a group of points on the first surface,
        obtain a center of gravity from a group of points on the second surface using the data measured by the second measurement circuit, and
        obtain a thickness of the measuring target from the equation of the plane and the center of gravity.

2. The shape measuring device according to claim 1, wherein
    the first measurement circuit and the second measurement circuit are further configured to include a non-contact sensor configured to measure the plurality of measurement points without contacting the measurement target.

3. The shape measuring device according to claim 1, wherein
    the first measurement circuit and the second measurement circuit each have a two-dimensional sensor configured to scan the surfaces of the measurement target.

4. The shape measuring device according to claim 1, wherein
    the first measurement circuit is a measurement circuit configured to perform measurement using a first sensor facing the first surface of the measurement target,
    the second measurement circuit is a measurement circuit configured to perform measurement using a second sensor facing the second surface of the measurement target, and
    the holder is configured to fix and hold the measurement target during a measurement period.

5. The shape measuring device according to claim 1, further comprising a moving device fixed to the holder and configured to positon the measurement target with respect to the first measurement circuit and the second measurement circuit.

* * * * *